C. R. WAID.
MINE CAR RUNNING GEAR.
APPLICATION FILED FEB. 14, 1916.
1,275,188.
Patented Aug. 6, 1918.
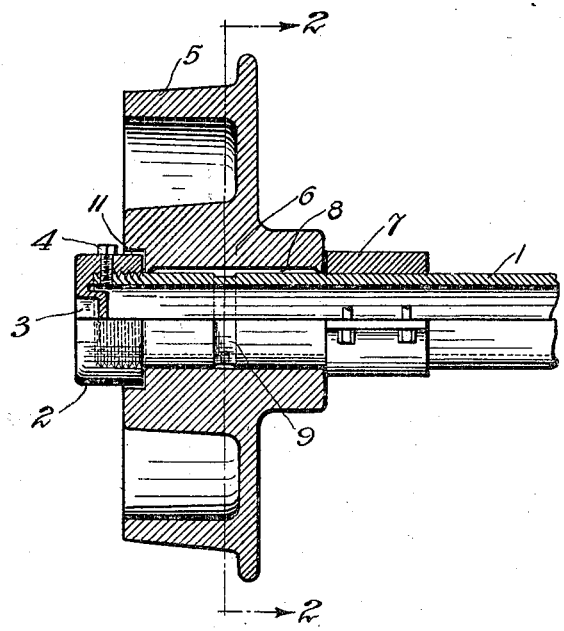
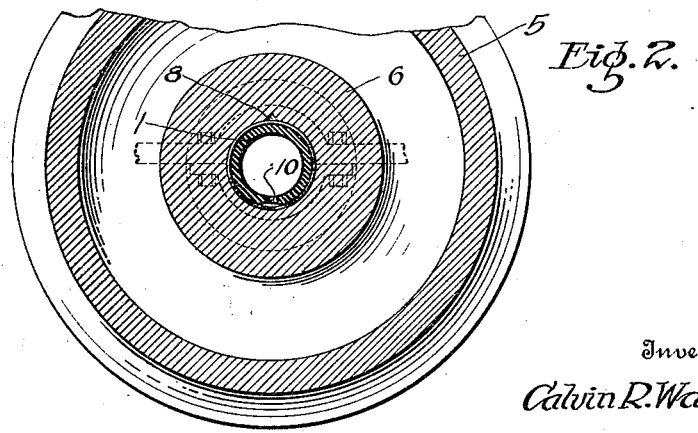
Inventor
Calvin R. Waid
By R. Peale Herrick,
Attorney

UNITED STATES PATENT OFFICE.

CALVIN R. WAID, OF BIRMINGHAM, ALABAMA.

MINE-CAR RUNNING-GEAR.

1,275,188. Specification of Letters Patent. Patented Aug. 6, 1918.

Application filed February 14, 1916. Serial No. 78,128.

*To all whom it may concern:*

Be it known that I, CALVIN R. WAID, a citizen of the United States, residing at Birmingham, in the county of Jefferson and State of Alabama, have invented new and useful Improvements in Mine-Car Running-Gear, of which the following is a specification.

This invention relates to mine car wheels and means for oiling and holding them in running position on a tubular axle which forms a reservoir for the oil or lubricant that is supplied to the wheel bearings.

One object of this invention is to make as simple as possible the construction of the wheel, the means for holding it in running position and the arrangement for filling the reservoir with lubricant. To this end I thread the outer end of the axle and screw thereon a standard pipe cap that forms an end thrust bearing and collar to hold the wheel in position. After screwing the cap home I drill a hole through both cap and axle to form an oil inlet normally closed by a pipe plug which serves as a means for locking the cap on the axle and positively preventing the wheel working off.

Another feature of my invention has to do with the feed of lubricant from the axle reservoir to the wheel bearing. This I accomplish by cutting a shallow circumferential groove in the bearing face of the axle and providing one or more ports in the bottom of the axle opening into this groove. The bore of the wheel hub makes a close running fit on the axle and is provided with a shallow longitudinal groove cut between points just short of the ends of the hub so it will be closed at its ends by the hub. This groove at its center will travel always over the groove in the wheel axle and as the hub turns on the axle its surface friction on the thin film of oil in the groove will be such as to carry this oil above its normal level in the groove to an extent proportioned to the speed of rotation of the wheel. As a result, under maximum speed conditions the wheel hub maintains a ring of oil about the axle, which ring is constantly in communication with the longitudinal oil groove in the hub and is therefore continuously supplying lubricant across substantially the whole surface of the bearing. It will be at once evident that the arrangement which I have described provides for the most inexpensive machine work and for the use of standard supplies so that the wheel can be assembled at a minimum of expense and at the same time possess the maximum characteristics of rugged strength and durability.

As illustrative of my invention, I have shown in the accompanying drawings in Figue 1, a longitudinal section through a wheel with the axle shown in quarter section; and in Fig. 2 I have shown a transverse vertical section taken on the plane indicated by the dotted lines 2—2 of Fig. 1.

I have used the same reference numerals to refer to the same parts in both figures.

In the drawings, 1 is a tubular axle formed of piping or tubing cut to the desired length and having its bearing end turned and threaded at its outer end to receive a pipe cap 2 having a countersunk square socket 3 and adapted to screw onto the pipe until it buts against the end thereof. When in this position the axle and cap are placed in a drill press and a hole drilled entirely through both and then threaded so as to receive a pipe plug 4 which is made long enough to pass down through both cap and axle and to close the hole which serves as the oil inlet port. This will be located in what will be the top of the axle when in service. The wheel 5 may be of any suitable character and preferably has its hub portion 6 undercut at 11 so as to overhang the joint between the cap and the axle and protect it from dust and dirt. The wheel hub runs between the pipe cap 2 and an axle box 7 which holds the axle against turning and any well understood arrangement of thrust washers or like devices may be used at either or both ends of the hub. The hub bore is turned smooth inside and then a shaper tool passed lengthwise through the bore to give a single cut, thus forming a longitudinal oiling groove or channel 8, which at its ends preferably stops just short of the ends of the hub bearing. Around the center of the bearing surface of the axle I turn a shallow groove 9 having appreciable width and a very slight depth and I provide an oil port 10 leading from the bottom portion of the axle and opening into this annular groove 9.

In operation, the wheels are slipped on the axle, the caps are screwed on each end, after which the axle is filled with lubricant through the inlet ports provided therefor and then the pipe plugs 4 are screwed in, closing the oil ports and locking the caps.

The oil runs out through port 10 into the groove 9 and rises therein to the level of the oil in the axle. As the wheel rotates the oil channel 8 is supplied from the groove 9 and feeds the oil across the bearing but the channel 8 is so small that the flow is very slight and as the speed increases the surface friction of the hub on the film of oil in the groove 9 will carry said oil around until the groove is filled, whereupon the supply of oil to the channel 8 is constant. The channel 8 should be cut so that the flow of oil therethrough is negligible in amount but at the same time sufficient for lubricating the bearing.

In order to better safe-guard against the oil outlet port 10 becoming clogged I either file or chamfer the outer end of the opening on both sides so that as the wheel runs in either direction it will have a tendency to wipe out the oil way and prevent the accumulation of matter therein which would choke the feed of the lubricant. It will be understood that grease, oil or any desired lubricant may be charged into the hollow axle to lubricate the bearings.

What I claim as new and desire to secure by Letters Patent, is:—

1. In combination, an axle having an oil chamber adapted to be filled with lubricant and a shallow circumferential oil groove surrounding the axle substantially at the center of its wheel bearing portion, there being an outlet port adapted to drain the lubricant leading from the said chamber into said groove, a wheel mounted on said bearing portion of said axle, and a shallow oil distributing channel cut lengthwise in the hub bore of the wheel and stopping just short of its ends, said channel being adapted to travel always in register with said groove from which it is charged with oil during a part of each rotation of the wheel proportionate to the speed of wheel rotation.

2. In combination, a wheel having a smooth bore with a narrow shallow longitudinal oil distributing groove extending lengthwise of and stopping just short of each end of the bore, an axle bearing for the wheel which is hollow and adapted to be filled with lubricant and which has an external circumferential channel which is of appreciable width but very shallow and which is disposed substantially opposite the center of the hub of the wheel, there being an oil port opening from the bottom part of the axle into said shallow circumferential groove, and means to hold the wheel in running position on its bearing, substantially as described.

In testimony whereof I have hereunto set my hand in presence of a subscribing witness.

CALVIN R. WAID.

Witness:
NOMIE WELSH.